(12) United States Patent
Hackenschmied et al.

(10) Patent No.: US 8,466,423 B2
(45) Date of Patent: Jun. 18, 2013

(54) X-RAY RADIATION DETECTOR FOR DETECTING IONIZING RADIATION, IN PARTICULAR FOR USE IN A CT SYSTEM

(75) Inventors: Peter Hackenschmied, Nürnberg (DE); Christian Schröter, Bamberg (DE); Matthias Strassburg, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 515 days.

(21) Appl. No.: 12/731,179

(22) Filed: Mar. 25, 2010

(65) Prior Publication Data

US 2010/0246758 A1 Sep. 30, 2010

(30) Foreign Application Priority Data

Mar. 30, 2009 (DE) .......................... 10 2009 015 563

(51) Int. Cl.
*G01T 1/24* (2006.01)

(52) U.S. Cl.
USPC ................................ 250/370.09; 250/370.14

(58) Field of Classification Search
USPC ...................................................... 250/370.14
See application file for complete search history.

(56) References Cited

U.S. PATENT DOCUMENTS 4,227,942 A * 10/1980 Hall .............................. 136/255

(Continued)

FOREIGN PATENT DOCUMENTS

| DE | 2235680 | 2/1974 |
|---|---|---|
| DE | 4018013 | 12/1991 |
| DE | 19618465 | 6/1997 |
| JP | 59-099384 | 6/1984 |

OTHER PUBLICATIONS

Office Action for German patent application No. 10-2009-015-563.5 dated Mar. 5, 2010.

(Continued)

*Primary Examiner* — David Porta
*Assistant Examiner* — Djura Malevic
(74) *Attorney, Agent, or Firm* — Harness, Dickey & Pierce, P.L.C.

(57) ABSTRACT

An X-ray radiation detector is disclosed for detecting ionizing radiation, in particular for use in a CT system, with a multiplicity of detector elements. In at least one embodiment, each detector element includes a semiconductor used as detector material with an upper side facing the radiation and a lower side facing away from the radiation, at least two electrodes, wherein one electrode is formed on the upper side of the semiconductor by a metallization layer, and the sum of all detector elements forms a base, which has a base normal at each point. In at least one embodiment, the invention is distinguished by the fact that the upper side of the semiconductor has a surface structure with a surface normal at each point, wherein the surface normal at least in part subtends an angle to the base normal. In at least one embodiment, the invention furthermore relates to a CT system provided with an X-ray radiation detector, which advantageously includes a multiplicity of detector elements structured according to at least one embodiment of the invention.

14 Claims, 3 Drawing Sheets

U.S. PATENT DOCUMENTS

| | | | |
|---|---|---|---|
| 4,703,337 A | 10/1987 | Yamazaki | |
| 4,915,482 A * | 4/1990 | Collins et al. | 359/276 |
| 6,054,718 A * | 4/2000 | Dodd et al. | 257/10 |
| 6,878,942 B2 * | 4/2005 | Danielsson | 250/370.09 |
| 7,772,585 B2 * | 8/2010 | Uematsu et al. | 257/13 |
| 8,129,738 B2 * | 3/2012 | Barnes et al. | 257/98 |
| 2005/0082492 A1 * | 4/2005 | Lin et al. | 250/370.14 |
| 2005/0230630 A1 * | 10/2005 | Yanagita et al. | 250/370.09 |
| 2008/0224042 A1 * | 9/2008 | Irisawa et al. | 250/336.1 |
| 2009/0001254 A1 * | 1/2009 | Ogawa et al. | 250/208.1 |
| 2009/0057563 A1 * | 3/2009 | Irisawa et al. | 250/370.08 |

OTHER PUBLICATIONS

Poled M. Shikhaliev, "Titled angle CZT detector for photon counting/ energy weighting x-ray and CT imaging", Institute of physics publishing, Phys. Med. Biol. 51 (2006), pp. 4267-4287; Others; 2006.

* cited by examiner

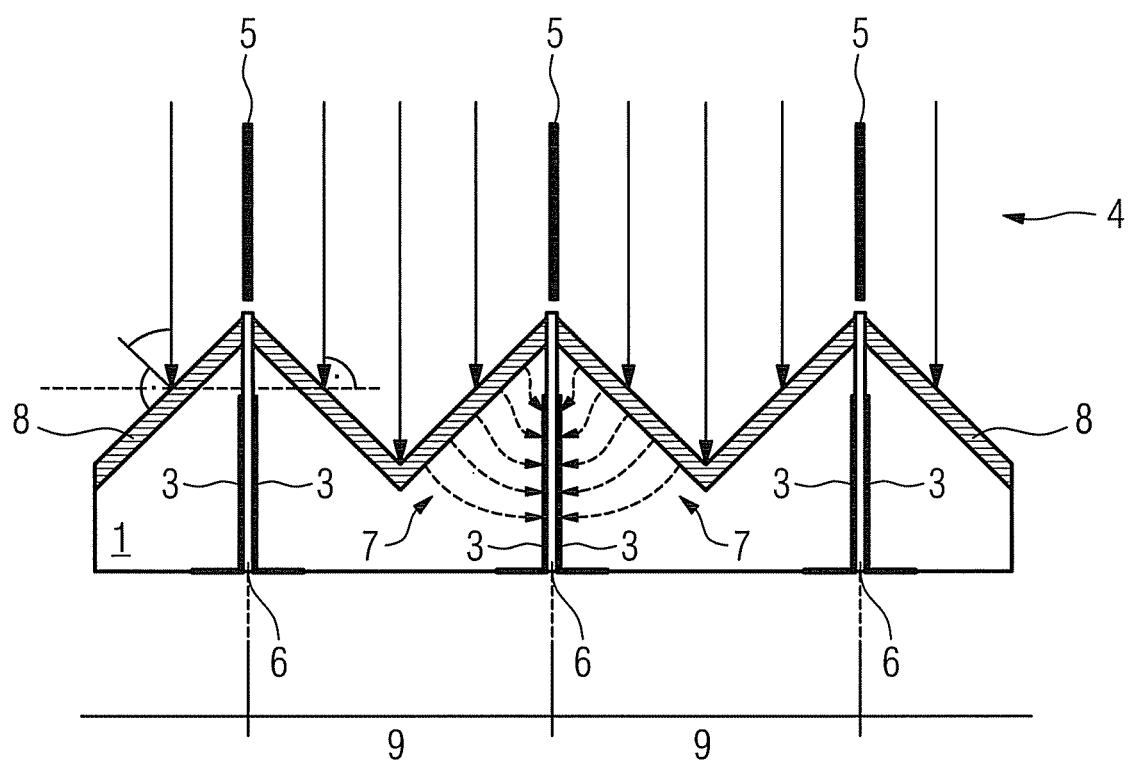

X-RAY RADIATION DETECTOR FOR DETECTING IONIZING RADIATION, IN PARTICULAR FOR USE IN A CT SYSTEM

PRIORITY STATEMENT

The present application hereby claims priority under 35 U.S.C. §119 on German patent application number DE 10 2009 015 563.5 filed Mar. 30, 2009, the entire contents of which are hereby incorporated herein by reference.

FIELD

At least one embodiment of the invention generally relates to an X-ray radiation detector for detecting ionizing radiation. In particular, at least one embodiment relates to, an X-ray radiation detector for detecting ionizing radiation for use in a CT system, with a multiplicity of detector elements, each detector element having a semiconductor used as detector material with an upper side facing the radiation and a lower side facing away from the radiation, at least two electrodes, wherein one electrode is formed on the upper side of the semiconductor by a metallization layer, and the sum of all detector elements forms a base, which has a base normal at each point.

BACKGROUND

Until now, scintillation detectors have been used for detecting gamma radiation and X-ray radiation, in particular in CT systems and dual-energy CT systems. In these detectors, the incident radiation is detected indirectly by the excitation of electrons and the conversion into photons. Moreover, direct-conversion detectors based on semiconducting materials, such as e.g. CdTe, CdTeSe, CdZnTe and CdZnTeSe, are known. These direct-conversion detectors are able to count individual photons and can thus directly detect the radiation.

Whilst some of the aforementioned semiconducting materials have been used successfully for X-ray radiation detection for a long time, the introduction of these materials into high-flux applications has not yet been successful. High-flux applications with a photon flux of more than $1*10^8$ photons/$cm^2*s$, as occur e.g. in CT systems, cannot yet be implemented thereby because in this case a particularly large number of charge carriers have to be separated very quickly and guided to the electrodes for detection. This is unproblematic for the negative electrons, but the less-mobile positive holes form a depletion zone, which adversely affects the electric field in the interior of the semiconductor material, i.e. it attenuates the field. The depletion zone basically follows the absorption profile of the X-ray radiation. It is therefore strongest on the side of the semiconductor detector facing the incident radiation. Depending on the size of the depletion zone, there can be a complete collapse of the electric field at this point. In the process, what holds true is that the stronger the depletion zone is, the more likely collapse of the electric field becomes. It follows that in order to ensure an even detector response that is independent of the photon flux, the formation of the depletion zone should be avoided or limited as much as possible.

First approaches for reducing the depletion zone in semiconducting detectors are already known. These consist of placing the entire detector at an angle with respect to the incident X-ray radiation. An article by P. M. Shikhaliev in Phys. Med. Biol. 51 (2006) describes the use of semiconducting detectors in a CT system, wherein these detectors are aligned obliquely to the incident X-ray radiation. This allows the use of thin semiconductor crystals with unchanging high photon absorption. In the process, there is a significant reduction in the polarization and an increase in the photon count rate.

Polarization is understood to be the reduction of the electric field by unmoving charges, generally bound to deep impurities, which can then capture the charge carriers generated by radiation, that is to say recombine with said charge carriers and thus suggest a significantly lower intensity of the radiation.

As a result of the trapped charge carriers, the effective mobility of the charge carriers is significantly reduced. However, a radiation detector must have a high charge-carrier mobility so that the electrons and holes generated during the irradiation can be separated in order thus to avoid the formation of a depletion in the detector and the effect of polarization caused thereby. According to this, the polarization limits the maximum flux that a direct-conversion detector is able to detect.

Moreover, a tilted detector allows higher spatial and energy resolutions, and shorter charge-carrier collection times, which allow high-flux applications in computed tomography. However, a simple tilt of the detector cannot realize a uniform angle of the surface with respect to the incident radiation because, due to beam widening effects, said radiation is incident on the surface at a different angle in the edge regions. Furthermore, this concept of the tilted detectors cannot be transferred to detectors for multi-row CT systems.

SUMMARY

At least one embodiment of the invention finds a further improvement for a semiconducting X-ray radiation detector aligned obliquely to the incident radiation such that the formation of a depletion zone in the interior of the semiconductor is avoided and this X-ray radiation detector can be used for high-flux applications in a meaningful fashion, for example in CT systems and also in multi-row CT systems.

The inventors have recognized, in at least one embodiment, that a suitable surface structure of the semiconductor used for detection can achieve an improved and more even distribution of the charge carriers, which leads to a reduction in the depletion zone. The surface structure of the semiconductor should be designed such that the associated surface normal is angled with respect to the direction of the X-ray flux at all points. In the process, the surface is metallized like in a conventional detector in order to make it conductive.

If the X-ray radiation is imagined to be individual, ideally parallel, beams, which are incident on the surface of the semiconductor at a certain regular distance from one another, this distance increases as the angle of the surface of the semiconductor relative to the incident beams increases. As a result of this, the charge carriers generated by the respective incident beams have a larger volume available in the semiconductor before they meet the charge carriers generated by the adjacent incident beams and thus create regions with increased charge carrier concentration. As a result of this, the depletion zone can be kept small as a result of the lower charge carrier concentration at the surface of the semiconductor and thus the polarization of the detector can be avoided, and therefore there is no attenuation of the electric field in the interior of the semiconductor. As a result of this, the use of direct-conversion semiconductor detectors is possible in high-flux applications, for example in a CT system, and as a result of the inherently structured surface of the semiconductor, such detectors can also be used in multi-row CT systems.

Thus, at least one embodiment of the invention relates to an X-ray radiation detector, wherein the surface of the semiconductor material used for the detection is structured and thus is tilted relative to the incident radiation. Thus, a more even distribution of the generated charge carriers can be obtained and, as a result thereof, the depletion zone is reduced such that the electric field is maintained in the semiconductor.

According to this basic idea, in at least one embodiment the inventors propose an X-ray radiation detector for detecting ionizing radiation, in particular for use in a CT system, with a multiplicity of detector elements, each detector element having:

a semiconductor used as detector material with an upper side facing the radiation and a lower side facing away from the radiation, at least two electrodes, wherein one electrode is formed on the upper side of the semiconductor by a metallization layer, and the sum of all detector elements forms a base, which has a base normal at each point.

According to at least one embodiment of the invention, the improvement consists of the fact that the upper side of the semiconductor has a surface structure with a surface normal at each point, wherein the surface normal at least in part subtends an angle to the base normal.

In order to achieve an effect which is as large as possible, that is to say to reduce the depletion zone as much as possible, or even completely avoid the latter, the angle between the base normal and the surface normal should be at least 45°. Values above 60° are even more advantageous, because in this case the distance between the impact points of the X-ray beams on the surface of the semiconductor is even larger than in the case of an angle of 45° and the charge carriers have more volume available to them in the crystal for unhindered propagation.

The upper side of the semiconductor relative to the radiation can be structured in a number of ways. For example, a zigzag profile or a wave profile, respectively with at least one tip or elevation, or a combination of a zigzag and a wave profile are suitable. In the case of the zigzag profile, the X-ray radiation between the edges always impinges on the semiconductor at an angle of 45°, preferably 60°. Only at the tips are there very small regions in which the radiation impinges perpendicularly on the semiconductor. The same holds true for a wave profile, except for that in this case the flat regions on the elevations on which the radiation impinges at a right angle are significantly larger, and therefore the zigzag profile is to be preferred.

Furthermore, an embodiment variant is also possible, in which the lower side of the semiconductor facing away from the radiation always runs parallel to the structured upper side, that is to say likewise in a zigzag shape, for example. However, in practice this makes contacting of the semiconductor by the readout electronics, generally implemented by a soldered or bonded connection, more difficult. For this, at least one passivation layer and/or wetting layer is deposited on the lower side of the semiconductor detector. If this should be applied to a structured surface, e.g. by way of lithography, this is technically very demanding.

Since the field lines of an electric field are always at right angles to a surface, the charge carriers are also led away at a right angle to the surface. It is only in the elevations of the structuring that there is an undesired concentration of the field lines and hence of the charge due to the field profile. This can be avoided if the collimators used in CT systems are positioned directly above the tips of the surface structure, i.e. for example directly above the tips of the zigzag profile. As a result of this, hardly any charge carriers are still generated in these critical regions, and said charge carriers are then insignificant for the formation of the electric field.

In order to achieve higher field strengths in a semiconducting detector material in the case of an overall more homogeneous electric field, at least one electrode can be attached laterally to each detector element, and so this is at least in part aligned with the base normal. In this case, it can furthermore be advantageous if a passivation layer made of a dielectric material is attached in each case between the individual detector elements. This affords higher detector resolutions. Electrodes positioned like that can be applied to the semiconductor, for example with the aid of etching steps or by vaporization.

The main advantage resulting from such a structuring of the upper side of a semiconductor in a direct-conversion detector is the suitability thereof for high-flux applications, that is to say, for example, in single-row or multi-row CT systems. Here, previously known compounds such as CdTe, CdTeSe, CdZnSe and CdZnTeSe can be used as semiconductor.

A further advantage is the use of the structuring independently of the crystal-growing method of the semiconductor because the structure is only introduced into the surface of the semiconductor on the finished crystal. Therefore, all conventional crystal-growing methods can be used for producing the semiconductor detector, such as physical vapor transport (PVT), traveling heat method (THM), vertical Bridgeman methods (VBM), metalorganic vapor phase epitaxy/deposition (MOVPE), various methods of vapor phase epitaxy/deposition (VPE), molecular beam epitaxy (MBE), and atomic layer epitaxy (ALE). Furthermore, the introduced structure on the surface of the semiconductor can be examined visually.

The scope of at least one embodiment of the invention also includes a CT system for generating tomographic records of an examination object, in which an X-ray radiation detector can be used with a multiplicity of detector elements, wherein the surface of the detector elements advantageously is structured according to at least one embodiment of the invention.

BRIEF DESCRIPTION OF THE DRAWINGS

In the following text, embodiments of the invention will be described in more detail on the basis of preferred examples with the aid of the figures, with reference being made to the fact that only the elements essential for the direct understanding of embodiments of the invention are shown. Herein, the following reference signs are used: 1: semiconductor; 2: charge carrier cloud; 3: electrodes; 4: X-ray radiation; 5: collimator; 6: passivation; 7: electric field lines; 8: metallization layer; 9: detector element; a: distance between the X-ray beams if the surface is not tilted; c: distance between the X-ray beams if the surface is tilted; g: base; $n_g$: base normal; $n_o$: surface normal; r: radius; α: angle.

In detail:

FIG. 6 shows a structured surface of a semiconductor in a detector according to an embodiment of the invention having electrodes on the edge.

DETAILED DESCRIPTION OF THE EXAMPLE EMBODIMENTS

Figure 1:
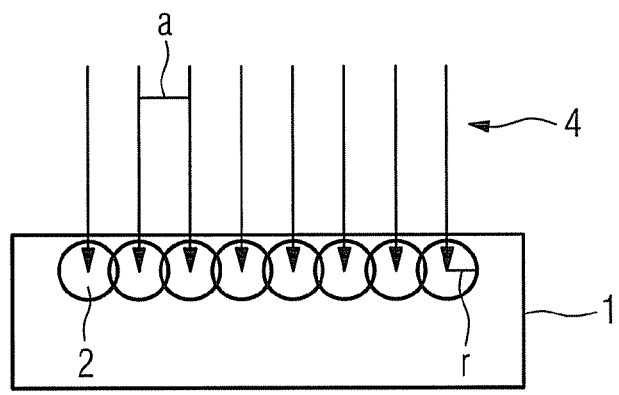
FIG. 1 shows a semiconductor with perpendicularly incident X-ray radiation.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a semiconductor 1, with X-ray radiation 4 impinging perpendicularly on the surface thereof. The individual beams of the X-ray radiation 4 run approximately parallel and impact on the surface of the semiconductor 1 at a distance a from one another. Subsequently, they excite charge carriers below the surface, which, respectively illustrated in a simplified fashion, form a charge carrier cloud 2 with a radius r. Here, the radius r is greater than half the distance a between the X-ray beams. This results in regions with an increased charge carrier concentration because adjacent charge carrier clouds 2 intersect. A depletion zone is formed in these regions, which leads to an attenuation of the electric field in the interior of the semiconductor 1 due to the subsequent polarization of the semiconductor 1 and prevents the transport away of the charge carriers generated by the X-ray radiation 4 towards electrodes (not illustrated here).

Figure 2:
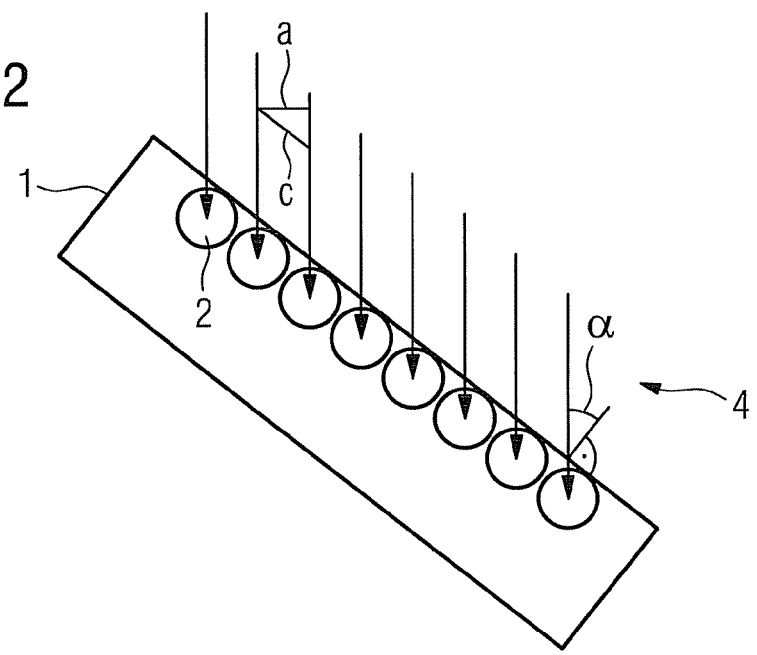
FIG. 2 shows a semiconductor with obliquely incident X-ray radiation.

A more even distribution of the charge carriers generated by the X-ray radiation 4 is obtained if the surface of the semiconductor 1 is tilted by an angle $\alpha$ relative to the incident X-ray radiation 4. This is shown in FIG. 2. In this illustration, the distance a between the individual beams respectively remains the same as in FIG. 1. However, due to the tilt of the surface of the semiconductor 1, the beams are incident on the semiconductor 1 at a larger distance c. This causes a more even distribution of the generated charge carrier clouds 2 without regions of very high charge carrier concentrations because said clouds do not intersect. Thus, the formation of a depletion zone can be avoided and the electric field in the semiconductor 1 is maintained.

Figure 3:
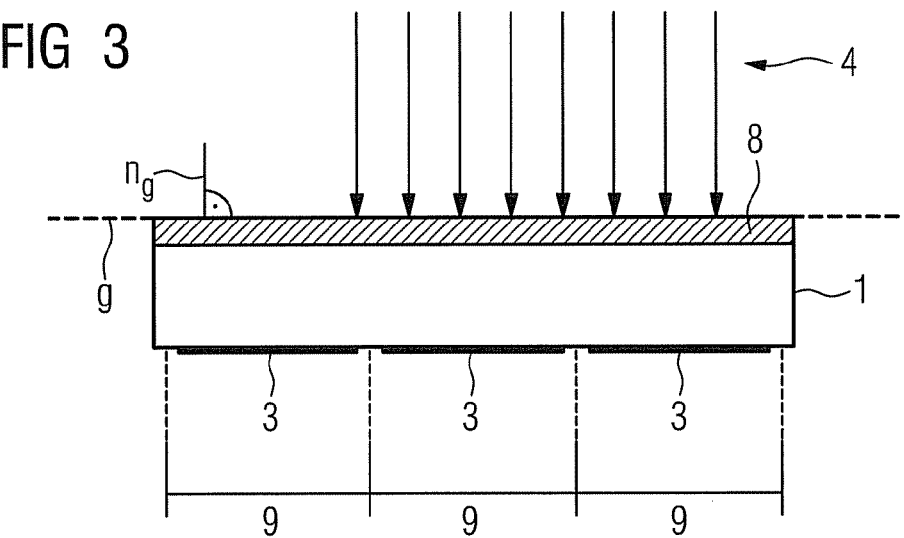
FIG. 3 shows an unstructured surface of a semiconductor in a conventional detector.

FIG. 3 shows a section of a conventional direct-conversion detector with an unstructured surface of a semiconductor 1 with three detector elements 9. The surface of the semiconductor 1 forms a base g with a base normal $n_g$ perpendicular at each point. A metallization layer 8, which also acts as an electrode on the upper side of the semiconductor 1, was applied in order to make the surface of the semiconductor 1 more conductive. There are further electrodes 3 on the lower side of the semiconductor. The proportions illustrated here are unrealistic and were only selected for better clarity.

X-ray radiation 4 is incident on the surface of the semiconductor 1 and in the semiconductor 1 it generates free charge carriers, which are led away to the positive anode due to a voltage applied to the metallization layer 8 and the electrodes 3 on the lower side. Here, the electrodes 3 on the lower side of the semiconductor 1 are connected to the positive pole. An electric field is thus formed in the semiconductor 1, wherein the field lines (not illustrated in this figure) are in each case perpendicular to the surface and the electrodes 3.

Analogously to FIG. 1, here this results in the above-described effects such as the formation of a depletion zone and the polarization resulting therefrom, which attenuates the electric field. As a result of this, such X-ray radiation detectors have yet to be used meaningfully for high-flux measurements because the attenuation of the electric field prevents fast away-transportation of the generated charge carriers and this results in falsified measurement results. A solution for improving the measurement results lies in structuring the surface of the semiconductor material used for the detection.

Figure 4:
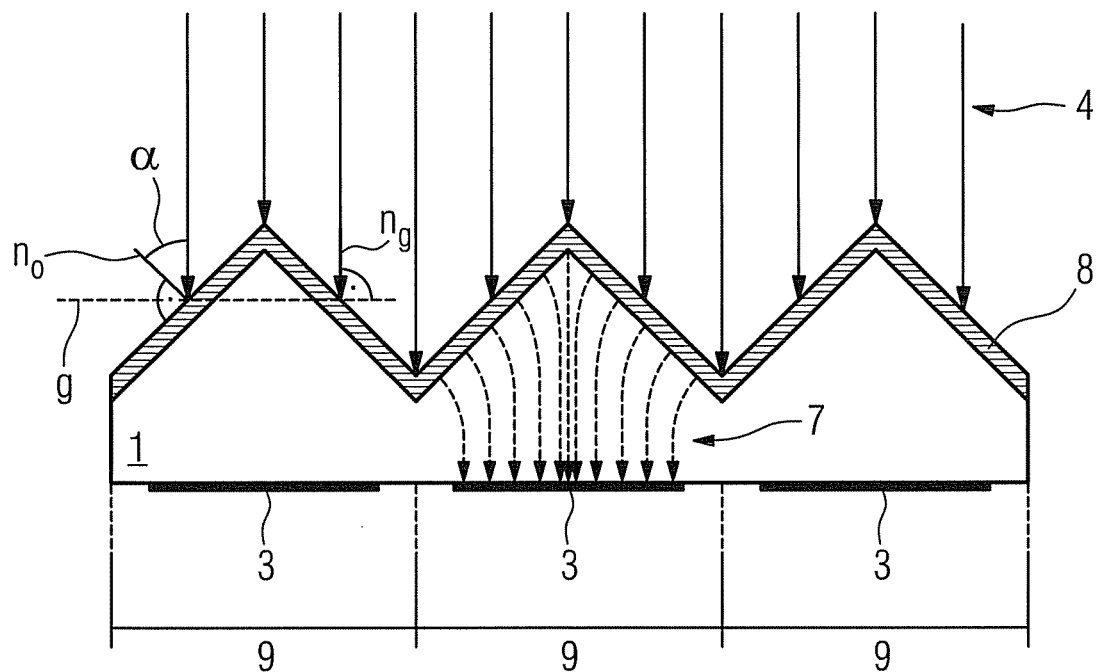
FIG. 4 shows a structured surface of a semiconductor in a detector according to an embodiment of the invention.

FIG. 4 shows a section of a direct-conversion detector with a surface of the semiconductor 1 structured according to the invention. Here, the structuring is designed as a zigzag profile, wherein the structured surface has a surface normal $n_o$ at every point. Said normal subtends an angle α with the base normal $n_g$. Thus, the X-ray radiation 4 impinges at an angle α on the semiconductor in all regions of the zigzag-shaped surface, except for the convex tips and the concave troughs. As per FIG. 2, the surface tilted relative to the incident radiation 4 ensures an even distribution of the charge carriers. It is only at the peaks where there is an increased charge carrier concentration. The typical profile of the electric field lines 7 between the metallization layer 8 on the upper side and the electrodes 3 on the lower side then generates a disadvantageous concentration of the electric charge transported away to the electrodes 3 at the lower side of the semiconductor 1. In this variant of the semiconductor detector with the structured surface according to an embodiment of the invention, a detector element 9 corresponds to the region with one electrode situated between two troughs in the zigzag profile.

Figure 5:
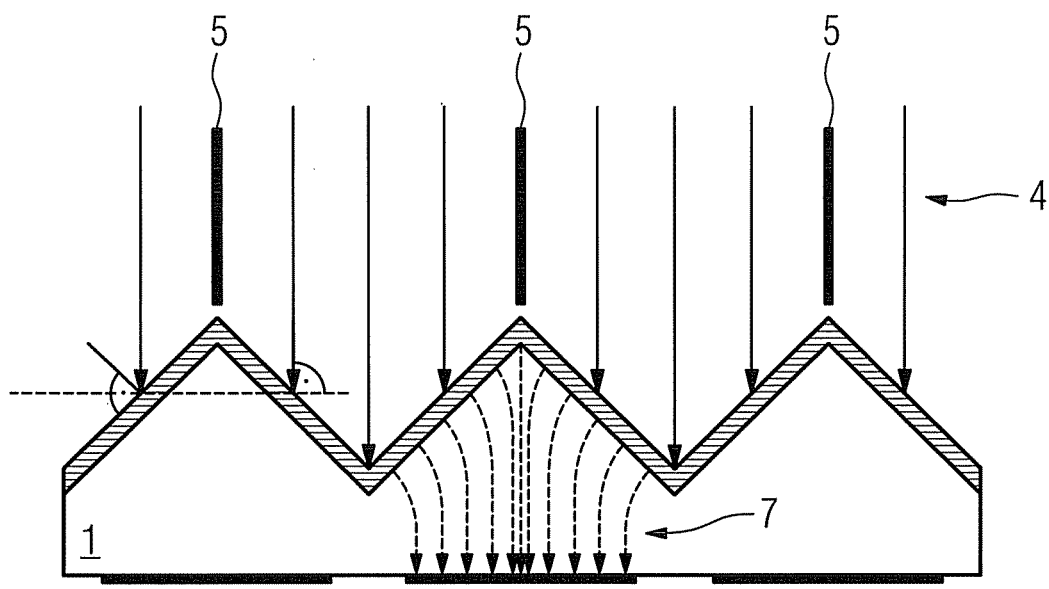
FIG. 5 shows a structured surface of a semiconductor in a detector according to an embodiment of the invention with collimators.

The concentration of the charge carriers results in the formation of a depletion zone in these regions and thus the concentration of the electric field below the tips in the interior of the semiconductor 1. That is to say, the electric field becomes inhomogeneous. In order to avoid this, the collimators 5 usually used in CT systems can be positioned directly above the tips, as shown in FIG. 5. As a result of this, less free charge is generated directly in the tips because almost no X-ray radiation 4 impinges there anymore. The field lines 7 of the electric field are no longer concentrated in these regions and the few generated charge carriers can be ignored. Thus, no depletion zones are formed in the critical regions below the tips due to increased charge carrier concentrations and the electric field is maintained.

It is additionally possible for the electrodes 3 in part to be arranged laterally on the detector elements 9 in order to homogenize further the electric field within the interior of the semiconductor 1. This is shown in FIG. 6. Here, there respectively is a dielectric passivation layer 6 between the individual detector elements 9, that is to say directly below the collimators 5, which layer delimits the individual detector elements 9 in a fashion impermeable to the charge carriers. The introduction of the passivation layer 6 is not mandatory, but it increases the resolution of the X-ray radiation detector. This illustration clearly shows that the profile of the field lines 7 between the metallization layer 8 and the electrodes 3 is almost completely homogeneous, without concentrated regions. In an X-ray radiation detector designed like this, the generated electrons can be transported away quickly to the electrodes 3 and so there is no generation of regions with an increased concentration, in which a depletion zone is formed that attenuates the electric field. Thus, such X-ray radiation detectors are also suitable for high-flux measurements, as are required, for example, in CT systems.

Thus, overall, an embodiment of the invention provides an X-ray radiation detector for detecting ionizing radiation, in particular for use in a CT system, with a multiplicity of detector elements, each detector element having a semiconductor used as detector material with an upper side facing the radiation and a lower side facing away from the radiation, at least two electrodes, wherein one electrode is formed on the upper side of the semiconductor by a metallization layer, and the sum of all detector elements forms a base, which has a base normal at each point, which was further improved to the extent that the upper side of the semiconductor has a surface structure with a surface normal at each point, wherein the surface normal at least in part subtends an angle to the base normal.

Furthermore, a CT system provided with an X-ray radiation detector, which advantageously includes a multiplicity of detector elements structured according to an embodiment of the invention, is also part of the subject matter of an embodiment of the invention.

It is understood that the aforementioned features of the invention can be used not only in the respectively specified combination, but also in other combinations or on their own, without departing from the scope of the invention.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An X-ray radiation detector for detecting ionizing radiation with a multiplicity of detector elements, each detector element comprising:
    a semiconductor used as detector material including an upper side facing the radiation and a lower side facing away from the radiation;
    at least two electrodes, one of the two electrodes being formed on the upper side of the semiconductor by a metallization layer and a sum of all the detector elements forming a base which includes a base normal at each point, and an underside of the semiconductor extends parallel to the base and over the entire base of each detector element, wherein a second of the two electrodes extends along the underside of the semiconductor,
    the upper side of the semiconductor including a surface structure with a surface normal at each point, wherein the surface normal at least in part subtends an angle to the base normal.

2. The X-ray radiation detector as claimed in claim 1, wherein the angle is at least 45°.

3. The X-ray radiation detector as claimed in claim 1, wherein the angle is at least 60°.

4. The X-ray radiation detector as claimed in as claimed in claim 1, wherein the surface structure of the semiconductor is designed as a zigzag shape with at least one tip.

5. The X-ray radiation detector as claimed in claim 1, wherein the surface structure of the semiconductor is designed as a wave-like shape with at least one elevation.

6. The X-ray radiation detector as claimed in claim 1, wherein the surface structure of the semiconductor in part is designed as a zigzag shape and partly as a wave-like shape with at least one of at least one tip and an elevation.

7. The X-ray radiation detector as claimed in claim 4, wherein a collimator is arranged above every tip.

8. The X-ray radiation detector as claimed in claim 1, wherein a dielectric passivation layer respectively is provided between two detector elements.

9. The X-ray radiation detector as claimed in claim 8, wherein at least one laterally attached electrode is provided on every detector element, the at least one laterally attached electrode extending at least in part in the direction of the base normal.

10. The X-ray radiation detector as claimed in claim 9, wherein the at least one laterally attached electrode is attached to the semiconductor with the aid of etching steps.

11. The X-ray radiation detector as claimed in claim 9, wherein the at least one laterally attached electrode is attached to the semiconductor by vaporization.

12. The X-ray radiation detector as claimed in claim 1, wherein the semiconductor consists of a material from the following list of materials: CdTe, CdTeSe, CdZnTe, CdZnSe and CdZnTeSe.

13. A CT system comprising an X-ray radiation detector with a multiplicity of detector elements as claimed in claim 1.

14. The X-ray radiation detector as claimed in claim 1, wherein the X-ray radiation detector is for use in a CT system.

* * * * *